United States Patent
Newman, Jr. et al.

(10) Patent No.: US 6,380,692 B1
(45) Date of Patent: Apr. 30, 2002

(54) PHASE CONTROLLED DIMMING SYSTEM WITH ACTIVE FILTER FOR PREVENTING FLICKERING AND UNDESIRED INTENSITY CHANGES

(75) Inventors: Robert C. Newman, Jr.; Donald F. Hausman, both of Emmaus; Robin C. Moseley, Allentown, all of PA (US)

(73) Assignee: Lutron Electronics, Inc., Coopersburg, PA (US)

( * ) Notice: Subject to any disclaimer, the term of this patent is extended or adjusted under 35 U.S.C. 154(b) by 0 days.

(21) Appl. No.: 09/664,232

(22) Filed: Sep. 18, 2000

Related U.S. Application Data

(63) Continuation of application No. 09/413,937, filed on Oct. 7, 1999, now abandoned, which is a continuation of application No. 08/942,833, filed on Oct. 2, 1997, now Pat. No. 6,091, 205.

(51) Int. Cl.[7] .................................. G05F 1/00
(52) U.S. Cl. ....................... 315/194; 315/291; 315/307; 315/DIG. 4
(58) Field of Search ................. 315/194, 199, 315/291, 276, 360, 362, DIG. 4, 307, 316; 323/217, 234, 235, 237, 300, 318, 319, 320, 322

(56) References Cited

U.S. PATENT DOCUMENTS

| | | | | |
|---|---|---|---|---|
| 3,990,000 A | * | 11/1976 | Digneffe ...................... | 323/322 |
| 4,728,866 A | * | 3/1988 | Capewell et al. ............ | 315/224 |
| 4,797,802 A | * | 1/1989 | Ng et al. ...................... | 363/87 |
| 4,823,069 A | | 4/1989 | Callahan et al. ........ | 315/194 X |
| 5,038,081 A | * | 8/1991 | Maiale, Jr. et al. ......... | 315/291 |
| 5,099,193 A | * | 3/1992 | Moseley et al. ............ | 323/324 |
| 5,264,761 A | * | 11/1993 | Johnson ...................... | 315/291 |
| 5,268,631 A | * | 12/1993 | Gorman et al. ............. | 323/246 |
| 5,424,618 A | * | 6/1995 | Bertenshaw et al. ........ | 315/324 |
| 5,430,356 A | * | 7/1995 | Ference et al. ............. | 315/291 |
| 5,650,694 A | | 7/1997 | Jayaraman et al. ......... | 315/255 |
| 5,821,703 A | * | 10/1998 | Callahan et al. ............ | 323/237 |

FOREIGN PATENT DOCUMENTS

JP     57-206932     12/1982

OTHER PUBLICATIONS

Horowitz, P. et al. "Active Filters and Oscillators", *The Art of Electronics*, second edition, 1991, Chapter 5, 272–275.

* cited by examiner

*Primary Examiner*—Haissa Philogene
(74) *Attorney, Agent, or Firm*—Woodcock Washburn LLP

(57) ABSTRACT

A phase controlled dimming system having an active filter for receiving the AC line voltage waveform, and for recovering the AC fundamental waveform therefrom is disclosed. The recovered AC fundamental waveform is supplied to a zero crossing detector that provides zero crossing indications of the AC fundamental waveform. The recovered AC fundamental is substantially free of noise or distortion, and of frequency components greater than at least second order harmonics, that may be present on the AC line voltage waveform, and that might otherwise result in faulty or incorrect zero crossing detection. An output of the zero crossing detector is supplied to a microprocessor that controls the gating of a controllably conductive device interposed between the controlled load and the AC source based on the zero crossing information. The filter may take an analog or digital (software) form.

10 Claims, 11 Drawing Sheets

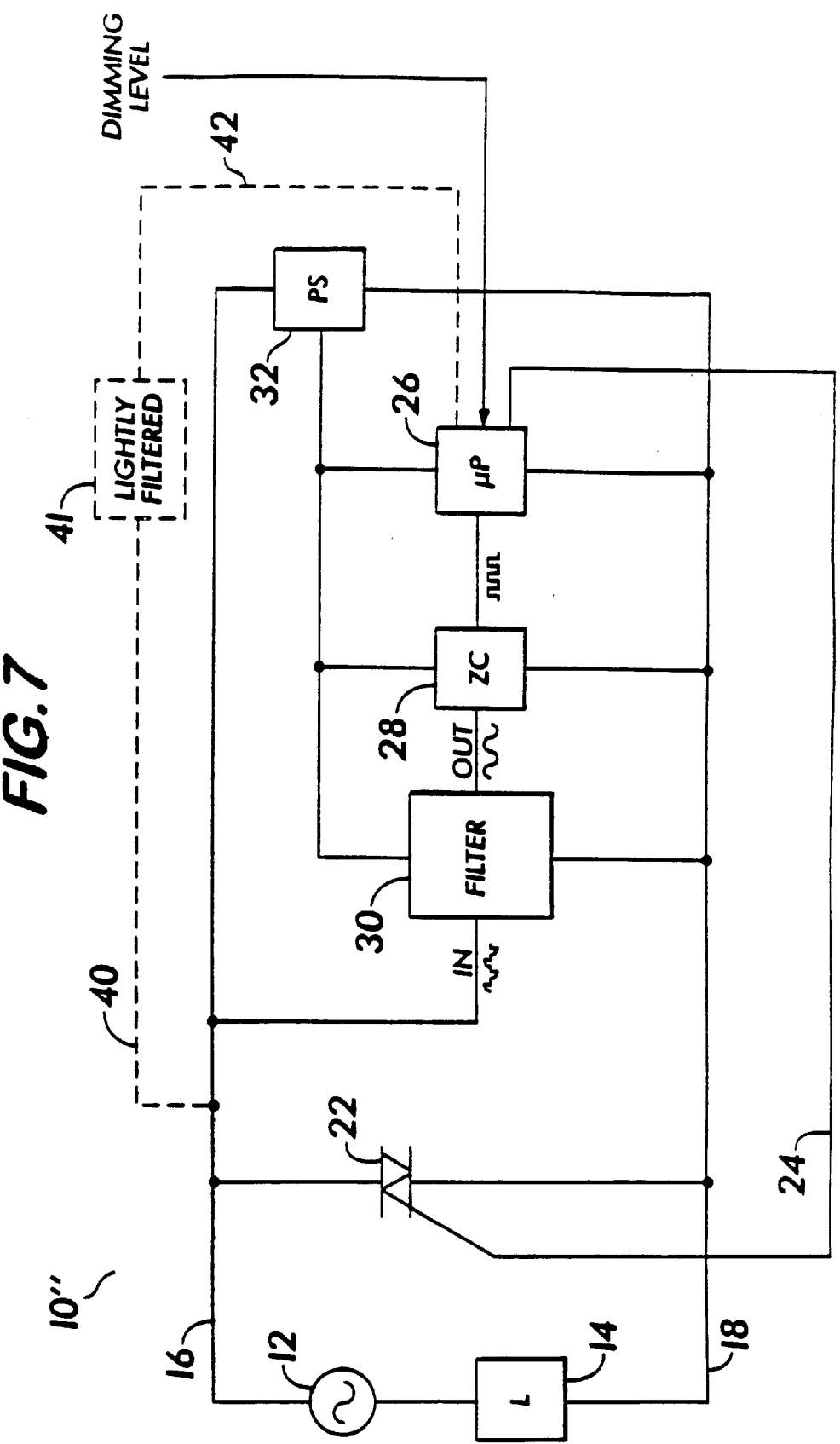

PHASE CONTROLLED DIMMING SYSTEM WITH ACTIVE FILTER FOR PREVENTING FLICKERING AND UNDESIRED INTENSITY CHANGES

This Application is a continuation of application Ser. No. 09/413,937 filed Oct. 7, 1999 now abandoned, which is a continuation of application Ser. No. 08/942,833, filed Oct. 2, 1997, now U.S. Pat. No. 6,091,205, both of which are incorporated herein in their entireties by reference.

FIELD OF THE INVENTION

The present invention relates generally to electronic systems that employ a phase control technique to control the amount of power delivered from an AC source/AC line to a load, such as a lighting load. The present invention specifically relates to a lighting control system such as a dimming panel or a wall mounted dimmer switch, that employs a phase control technique to control the dimming level of a lighting load by altering the conduction angle of a thyristor that is in series with the load.

BACKGROUND OF THE INVENTION

The present invention is described herein in the context of a dimming system for a lighting load, but is not limited thereto. The present invention has applicability in any AC phase control system where it is desired to minimize undesired variations in the power delivered to a phase controlled load caused by a noisy or unstable AC source, especially at low levels of delivered power.

Most lighting control systems that have a dimming capability employ a thyristor in series with the AC lighting load to effect the dimming function. Dimming is performed by altering the conduction angle of the thyristor, usually by delivering a trigger signal to a gate of the thyristor such that the timing of the trigger signal varies with the selected dimming level. In a typical forward phase control system, generation of the trigger signal is synchronized with the AC line voltage (the fundamental frequency waveform of which is sometimes referred to herein as "the AC fundamental" such that, some time after a zero crossing of the AC line voltage is detected, the trigger signal is generated, the gate of the thyristor is energized, and the thyristor conducts for the remainder of the AC half cycle. During the time interval between the detection of the zero crossing and the generation of the trigger signal, the thyristor is non-conducting (during which time no power is delivered from the AC source to the load), and usually this time interval is altered in response to adjustment of a dimming knob or slider by a user, or in response to changes in a dimming signal level. Altering this time interval thus alters the conduction angle of the thyristor, and hence alters the RMS power delivered to the load. See commonly assigned U.S. Pat. No. 5,430,356 entitled "Programmable Lighting Control System With Normalized Dimming For Different Light Sources", the entirety of which is incorporated herein by reference.

At low levels of delivered power (i.e., conduction beginning at phase angles greater than about 135° for each first half cycle, and greater than about 315° for each second half cycle, of the AC fundamental), even a small variation in the conduction angle usually represents a relatively large variation in the percentage of the total delivered RMS power. At these low power levels, any variation of the conduction angle, whether between AC cycles or over periods of time, can be manifested as annoying and unacceptable intensity changes, including visible flickering of the light source.

Since the conduction angle is dependent on the detection of the zero crossing, it is crucial that zero cross detection be accurate and reliable. AC line conditions are rarely ideal, and less than ideal conditions can cause inaccuracy in the detection of zero crossings, with consequent intensity variations and/or flickering, as well as other problems, especially at low levels of delivered power.

The prior art has recognized that one condition that can cause intensity variations and/or flickering is intermittent and/or periodic electrical noise on the AC line. For example, voltage "spikes" can be imposed on the AC line by the switching on and off of heavy equipment such as large motor loads. See FIG. 1. Electrical noise on the AC line can be incorrectly interpreted by the dimming circuitry as zero crossings of the AC fundamental, and these false interpretations can lead to premature and/or erratic conduction of the thyristor. The prior art has also recognized that another condition that can cue intensity variations and/or flickering is distortion of the AC waveform, which can be caused by the mere presence of other loads on the line. Distortion may be characterized by a "bumpy" or "wavy" AC waveform, i.e., one that is not a smooth sinusoid. See FIG. 2. This "bumpiness" can also move relative to the AC fundamental, i.e., it is not synchronized to it. Distortion can also cause false zero crossing detection. One common prior art solution to the problem of detecting actual zero crossings in a noisy and/or distorted AC line is to employ a phase locked loop (PLL) to generate a signal internal to the dimming system having a frequency that is intended to track that of the AC fundamental. In this system, the internal signal is a new signal generated by the PLL that is intended to replicate the AC fundamental. The zero crossings of the internal signal are detected, and since it is relatively free of noise and distortion, zero crossing detection is relatively straightforward.

The prior art has also recognized (separately from the problems of noise and distortion) that frequency variations can occur in the AC line. A common prior art solution to the problem of detecting zero crossings in an AC line having unstable frequency is to sample the AC line during a small "sampling window" (e.g., 500 microsec. wide) at periodic intervals. In this type of system, known as "window detection", a sample timer is set to open the sample window just before the next zero crossing of the AC line is expected e.g., for a 60 Hz line, the sample window is opened at 8.33 msec. intervals. During the time that the sample window is open, the AC line is monitored for a zero crossing; the AC line is not monitored for zero crossings between sample windows. Any zero crossing that is detected after the sample window has been opened can be taken as the actual zero crossing of the AC line, and the sample timer is reset. In a prior art system that has made and sold by the assignee hereof as the Grafik Eye 4000 Series dimming panel, the last zero cross detection is used as the actual zero cross crossing of the AC line. The window detection method can detect zero crossings in an AC line of unstable frequency provided that the change in period is not so substantial that the actual zero crossing falls outside of the sampling window.

The prior art, therefore, has attempted to detect zero crossings by either operating upon a separately generated signal that is intended to replicate both the phase and frequency of the fundamental of the AC line, or by operating upon the AC line itself.

Another condition that can cause intensity variations and/or flickering is changes in the RMS voltage of the AC line. Changes in the RMS voltage of the AC line can be caused by the presence of harmonics of the AC fundamental on the AC line; the presence of these harmonics changes the shape of the AC line voltage waveform from a pure sinusoid to, e.g., a generally sinusoidal waveform having flattened peaks, rather than round peaks. See FIG. 3. Changes in the RMS voltage of the AC line will cause intensity changes in the lighting load because such changes result in variations of the total power delivered to the load, irrespective of when the zero crossings occur.

The prior art has failed to recognize that the conditions of noise/distortion on the AC line, on the one hand, and frequency variation of the AC line, on the other hand, may be simultaneously and/or alternatively present The prior art has also failed to recognize that, in addition to the presence of these conditions, the condition of changing RMS voltage may also be simultaneously and/or alternatively present. To make matters worse, all of these conditions may be variably and intermittently present on the AC line, and these and other line conditions may be constantly changing. A condition that is present at one moment may be gone or replaced by another at the next moment; one combination of conditions may exist at one moment and be replaced by another combination at the next moment; and/or all or none of these conditions may exist at any given time. Thus, in this respect, the condition of the AC line can be extremely dynamic. No prior art has attempted to address the problem of detecting zero crossings in the AC line under combinations of these conditions, in part, because the prior art has not recognized this dynamic nature of the AC line.

The applicants hereof have not only recognized the dynamic nature of the AC line, but have also recognized why the prior art is incapable of addressing all of these conditions. In particular, the applicants hereof have recognized that conventional techniques for detecting zero crossings in the presence of noise/distortion are inconsistent with conventional techniques for detecting zero crossings in an AC line of unstable frequency, and that the prior art solutions to these problems conflict. For example, the conditions of noise and distortion suggest that the AC line be integrated over a number of cycles, and therefore over a period of time, as is done when using a phase locked loop. The conditions of frequency changes and changes in RMS voltage, however, suggest an instaneous analysis of the AC line and an instantaneous response to any frequency or RMS voltage change. Clearly, invoking a time delay and instantaneous analysis and response are conflicting solutions.

The applicants hereof have also discovered that above described PLL and window detection methods are inconsistent and conflicting solutions.

The PLL method that is effective in a noisy environment is ineffective when the AC line frequency is unstable, because the PLL effectively employs an integration technique and frequency changes in the AC line can result in a temporary phase shift between the internally generated signal and the AC line. Over time, the PLL will adjust the phase of the internal signal to create substantial coincidence with the AC line, but during the adjustment time, the conduction angle of the thyristor will vary and may be manifested as slow intensity variations in the lighting load. This condition can be aggravated if the magnitude and/or rate of frequency variation of the AC line is greater than the error correction rate of the PLL, because the PLL may then be unable-to track the AC line due to timing limits in the software. In this event, the phase difference between the AC line and the internal signal will become great, and the intensity of the light source may vary significantly. Any time there is a substantial difference between the AC line zero cross and the internally generated signal of the PPL for a substantial period of time, visible changes in light will occur.

The window detection method that is effective to detect zero crossing in an AC line of unstable frequency is ineffective in the presence of noise/distortion because, when the sample window is open, any zero crossing that occurs, whether due to noise, distortion or an actual zero crossing of the AC line, can be taken as the actual zero crossing of the AC line. This type of system does not adequately distinguish noise and distortion from actual zero crossings, and can possibly aggravate flickering/intensity variation problems caused by false detection of zero crossings due to noise/distortion.

Thus, at least in the United States, where the frequency of the AC line delivered by U.S. electric utility companies has tended to be very stable, there has been no substantial need and/or effort to address the issue of frequency change in the AC line in a dimming system, and the prior art has tended to focus on the conditions of noise and distortion.

Some prior art systems gate the thyristor at regular periodic intervals, based on a selected dimming level, on the assumption that there will be no change in the timing of the zero crossings of the AC fundamental, or in the RMS voltage of the AC line after the thyristor has begun conducting. They are designed to deliver what is assumed will be a fixed amount of power once conduction begins. In these systems, the problems caused by frequency changes and changes in the RMS voltage of the AC line can be exaggerated. For example, in a given cycle, both the frequency of the AC line may change (causing a change in the time between zero crossings), and, the RMS voltage of the AC line may change during conduction. Since, once fired, the thyristor will continue to conduct until the next zero crossing occurs, the RMS power delivered to the load can vary substantially relative to a preceding or succeeding cycle.

If the integration time of the PLL is made sufficiently large to avoid the effects of AC line noise, frequency variations as small as 0.2% can be visible, and in some locations, especially in some less industrialized countries, the frequency of the AC line supplied by the electric company can change substantially more than this over very short periods of time.

Software can be employed in a dimming system to analyze the AC fundamental and address one or more of the above conditions, but a software based system can cause other problematic conditions, such as aliasing on the AC line, due to interaction between the system's sample clock and the AC line. Aliasing occurs when the waveform is under-sampled.

The prior art also includes a dimming system, known as the N-Module, that has been made and sold by the assignee hereof. A simplified diagram of a portion of the N-module is shown in FIG. 4. As shown, a transformer T1 steps down 120 VAC to 24 VAC. A 2.2 uF capacitor C1 placed across the output of T1, and before the full wave bridge rectifier (FWB), combines with the inherent leakage inductance of T1 to form an LC filter that reduces or eliminates frequencies above about 1.6 kHz.

The filtered signal is supplied to the FWB, and the full wave rectified output of the FWB is analyzed for zero crossings by a zero crossing detector ZC. The output of ZC is then used for dimming purposes. This prior art does not address any of the above discussed problems. This type of system will operate satisfactorily when the AC line frequency varies, but may not operate properly when the AC line is noisy because the corner frequency is too high to cut off noise components in the frequency range 60 Hz to 1.6 KHz.

The applicants hereof have determined that a solution to the dynamic problem discussed above requires a system that has both a fast response (for dealing with frequency variations in the AC line) and a narrow bandwidth (for eliminating the effects of noise and distortion outside the range of the fundamental frequency). The present invention is directed to such a solution.

BRIEF DESCRIPTION OF THE DRAWING

FIG. 7 illustrates a two wire embodiment of a dimming circuit employing the present invention.

SUMMARY OF THE INVENTION

Figure 1:
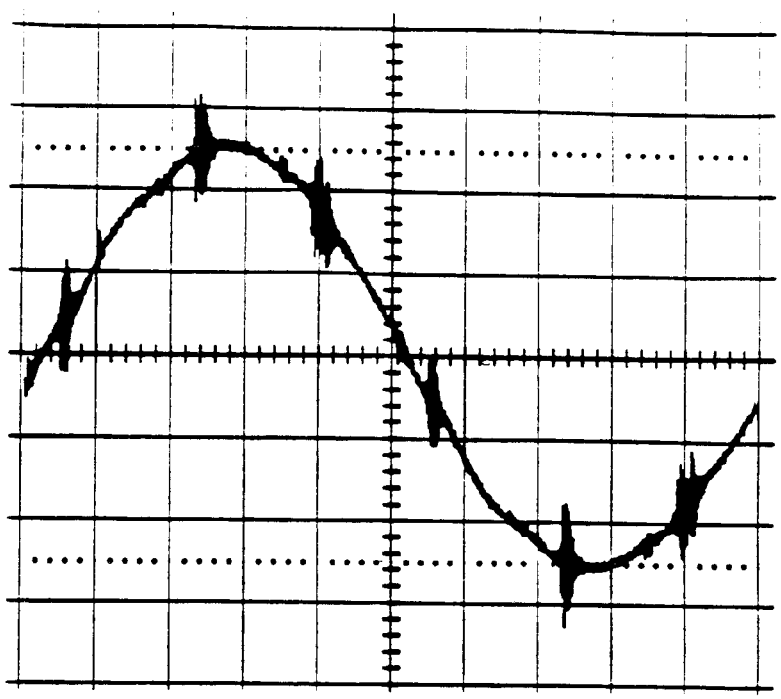
FIG. 1 is an exemplary plot illustrating the problem of noise spikes on an AC line in the prior art.
Figure 2:
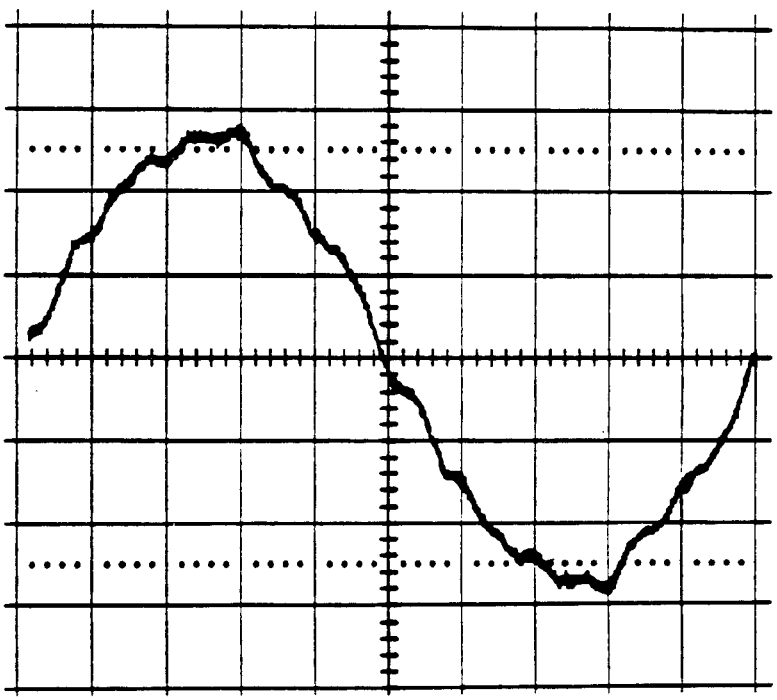
FIG. 2 is an exemplary plot illustrating the problem of a "wavy" or "bumpy" waveform caused by noise on the AC line in the prior art.
Figure 3:
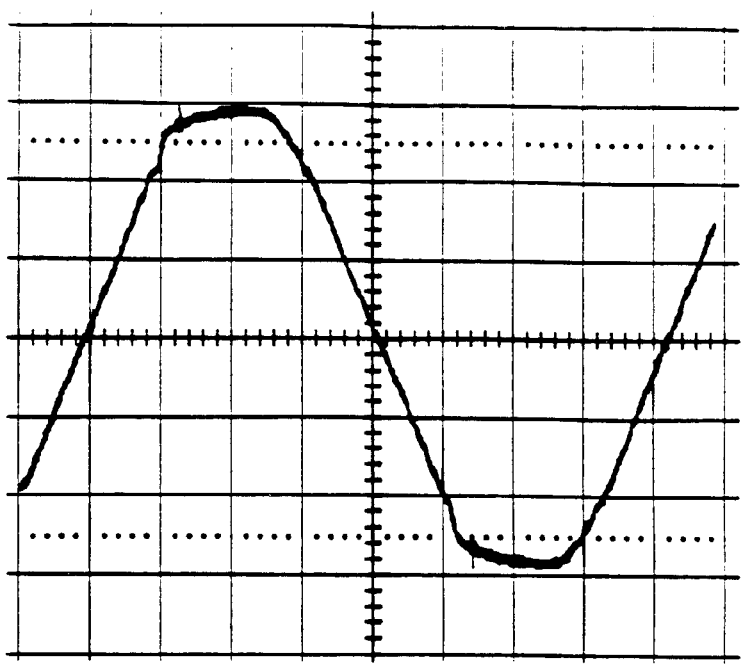
FIG. 3 is an exemplary plot illustrating the problem of distortion of the AC line voltage waveform caused by certain conditions in the prior art.
Figure 4:
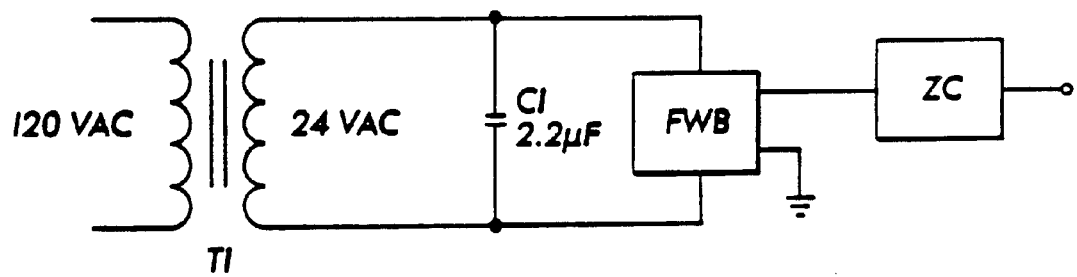
FIG. 4 illustrates a relevant portion of a prior art circuit.

A load control system for controlling power delivered to a load from an AC source comprises a filter for filtering the AC line voltage waveform to provide a signal that is an accurate reconstruction of the fundamental waveform of the AC line voltage ("AC fundamental") that is substantially free of any noise on, or distortion of, the AC line voltage waveform. The output of the filter, i.e., the AC fundamental, is supplied to a zero crossing detector that provides zero crossing indications of the AC fundamental, rather than of the AC line voltage waveform. The zero crossing indications are employed by a controller, such as a microprocessor, to calculate when a controllably conductive device interposed between the load and the AC source should be rendered conductive. The controller is responsive to the zero crossing indications and to a desired power level set by a user to control the conduction of the controllably conductive device.

In a preferred embodiment of the invention, the filter is an active low pass filter that attenuates frequency components of the AC line voltage waveform that are substantially equal to third harmonics and greater of the AC fundamental. In one embodiment of the invention, the filter is designed to provide a substantially linear phase delay of less than one half of a period of the frequency of the AC fundamental and has a substantially flat frequency gain characteristic up to about the frequency of the AC fundamental when the filter receives the AC line voltage in unrectified form, or up to about twice frequency of the AC fundamental when the filter receives the AC line voltage in rectified form. In this embodiment, the filter is further designed such that its gain characteristic decreases rapidly thereafter. For example, where the AC fundamental frequency is in the range of 50–60 Hz and the filter receives the AC line voltage waveform in unrectified form, the filter may be designed to have a corner frequency of about 55 Hz and to provide a phase delay of about 135° at the fundamental frequency and no substantial gain after about 150 Hz By way of another example, where the AC fundamental frequency is again in the range of 50–60 Hz but the filter receives the AC line voltage waveform in rectified form, the filter may be designed to have a corner frequency of about 111 Hz, and to provide a phase delay of about 135° at the fundamental frequency and no substantial gain after about 300 Hz.

In another embodiment, the controller measures the amount of phase delay interposed by the filter and adjusts the time after the measured phase delay at which the controllably conductive device turns on, to compensate for differences between a measured phase delay and the nominal phase delay of an ideal filter. This embodiment of the invention is useful to compensate for variances caused by aging filter components, or variances due to component tolerances. The controller attempts to control the controllably conductive device with a control signal of constant duty cycle so that the amount of power supplied to the load remains constant.

The filter may be embodied as an analog filter, such as a Bessel filter. The invention has application to dimming circuits, such as dimming panel systems and two and three wire wall mountable dimming switches.

DETAILED DESCRIPTION OF THE PREFERRED EMBODIMENT

The preferred embodiment of the present invention is described herein in the context of a dimming system for a lighting load, but is not limited thereto, except as may be set forth expressly in the appended claims. The present invention has application to any AC controller that employs a phase control technique for control of load power, i.e., a system where a controllably conductive device is either turned on or off based on a length of time after detection of a zero cross of the AC line, for example, a phase control or reverse phase control dimmer. Additionally, the present invention is described herein in the context of a wall mountable dimmer switch, but has applicability to any dimming system including, by way of example, dimming systems with panel mounted dimmers, and the present invention is directed to and encompasses all such systems. The implementation of the present invention in such applications and systems will be really apparent to those skilled in the art from the following description.

Figure 5:
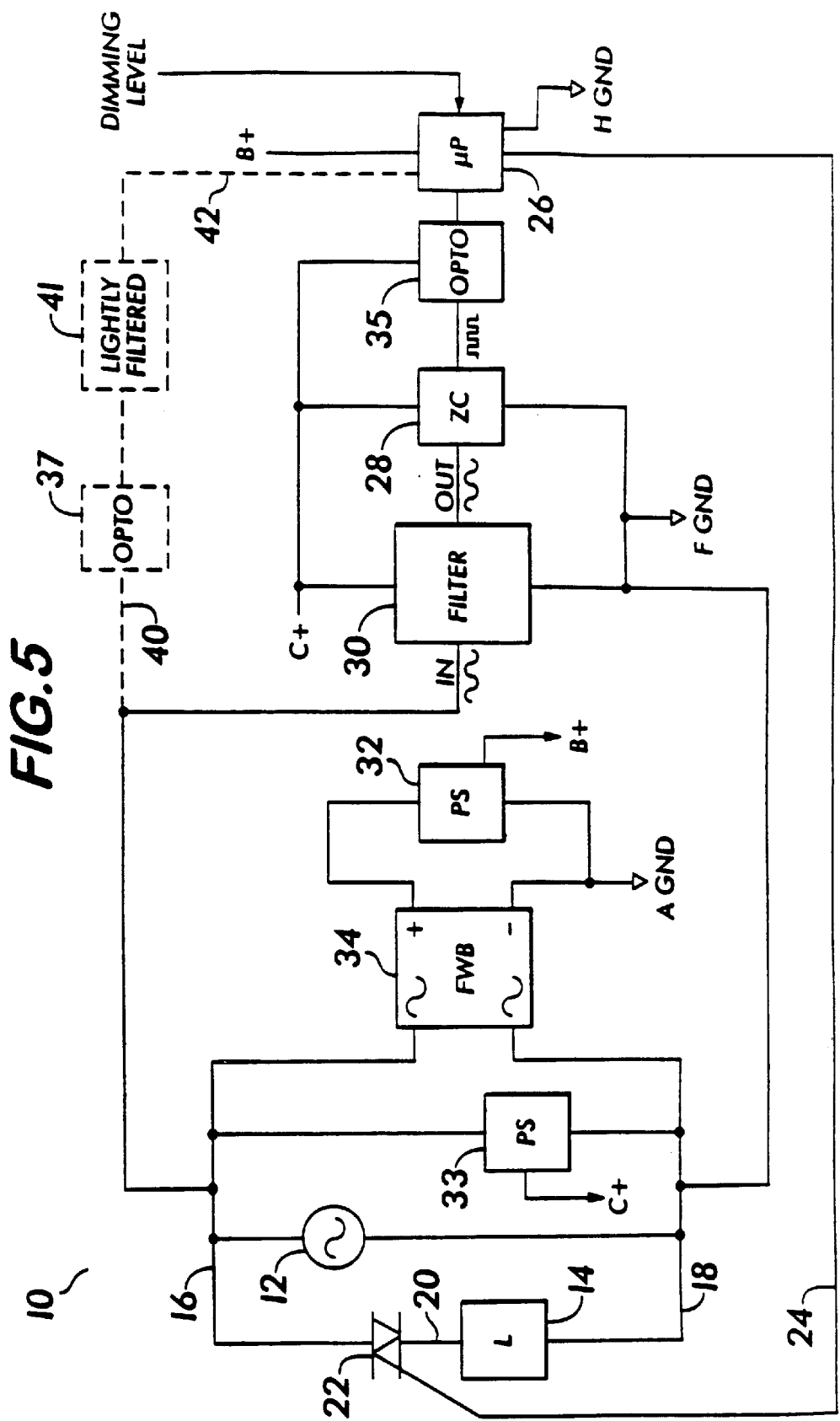
FIG. 5 illustrates one embodiment of a three wire dimming circuit employing the present invention.
Figure 6:
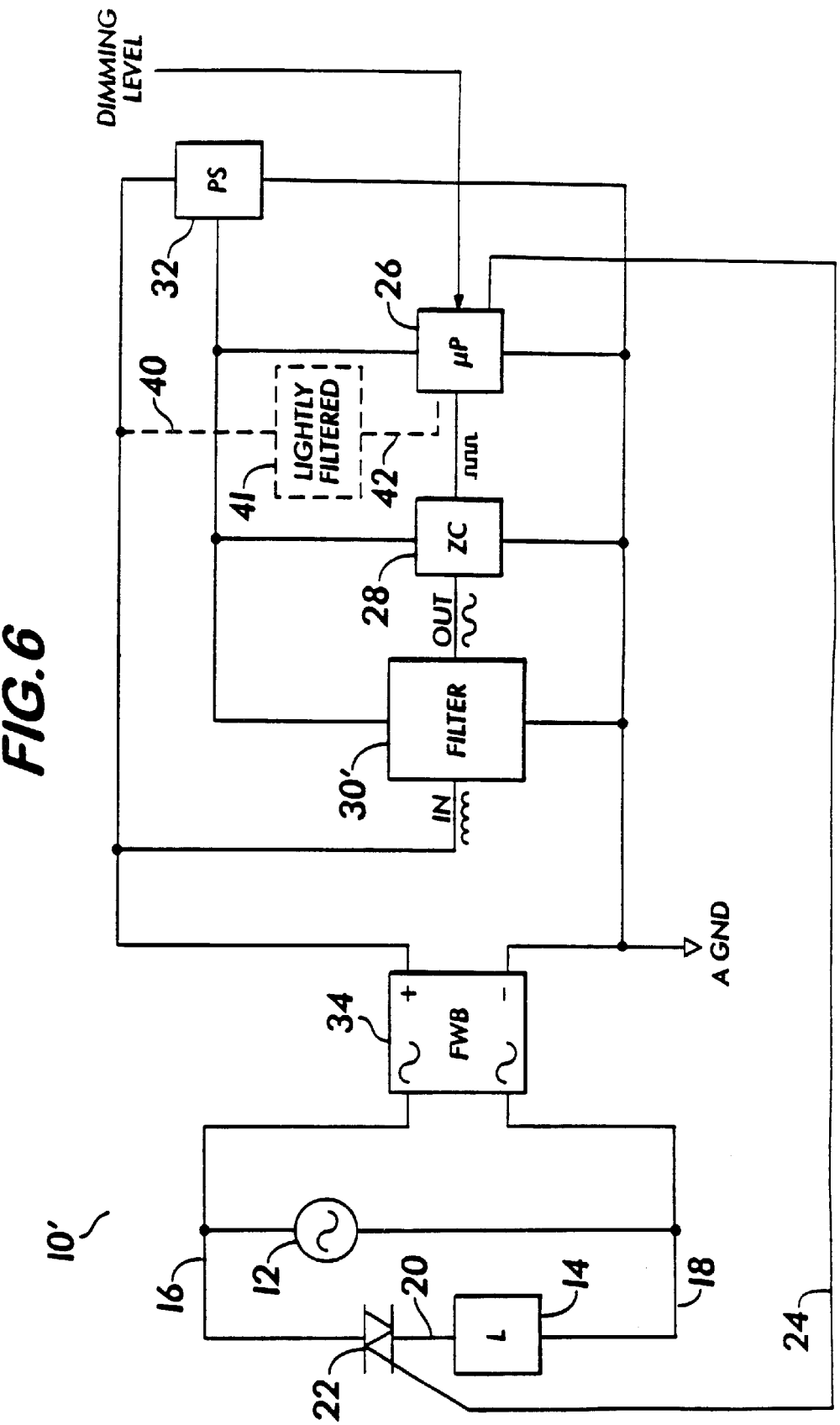
FIG. 6 illustrates another embodiment of a three wire dimming circuit employing the present invention.

Referring to the drawings, wherein like numerals represent like elements, there is shown in FIGS. 5–7 three different embodiments of a dimmer switch, such as a wall mountable dimmer switch, for a lighting load, each employing the present invention. FIGS. 5 and 6 illustrate the application of the invention in a typical three wire dimmer switch, and FIG. 7 illustrates the application of the invention in a typical two wire dimmer switch. Each embodiment is characterized by a pass band or low pass filter that receives the AC line voltage either directly, in unrectified form (FIGS. 5 and 7), or in full wave rectified form (FIG. 6). In each embodiment, the output of the filter is supplied to a zero cross detector and the output of the zero cross detector is supplied to a microprocessor (or an analog control circuit).

Particularly, referring to FIG. 5, the three wire dimmer switch 10 is connected to the AC source 12 and to the lighting load 14 by wires 16, 18, 20, in well known fashion. The load 14 is in series with a control device 22 that controls the RMS voltage applied to the load 14 in accordance with control signals supplied to a control electrode 24 by the microprocessor 26. In the embodiments illustrated in FIGS. 5, 6 and 7, the control device 22 is a controllably conductive device, such as a triac, MOSFET, IGBT, back to back SCR's, thyristors, etc., that receives trigger signals on a gate electrode 24 thereof from the microprocessor 26. The microprocessor 26 receives an input from a zero crossing detector 28 via an optocoupler 35 and also receives data indicative of the selected dimming level. Zero crossing detector 28 provides an output signal to the microprocessor 26 each time that a zero crossing of the input signal thereto is detected. Microprocessor 26 is programmed in well known fashion to set the desired dimming level in response to the zero crossing indications and the selected dimming level. A power supply 32 supplies necessary DC power to the microprocessor 26. A power supply 33 on the AC side of the bridge 34 supplies necessary power to the filter 30, the zero cross detector 28, and the optocoupler 35. A full wave bridge rectifier 34 is employed to rectify the AC line. The foregoing discussion is applicable to the three wire dimming switch 10' of FIG. 6, but the explanation thereof is somewhat simpler. In FIG. 6, since the filter 30' is on the DC side of the bridge 34, the power supply 32 supplies necessary DC power to the filter 30, the zero cross detector 28, and the microprocessor 26 and a separate supply is not necessary. In FIG. 5, the circuitry shown in dashed lines (optocoupler 37 and the "lightly filtered" circuit 41), and in FIG. 6, the circuitry shown in dashed lines (the "lightly filtered" circuit 41), and their connections also shown in dashed lines, are optional. An explanation of the "lightly filtered" circuit follows hereinafter.

In the embodiment of FIG. 7, the two wire dimming switch 10" is connected to one side of the load and to one side of the AC line by wires 16, 18 in well known fashion. Again, the load 14 is in series with a thyristor 22 that controls the RMS voltage applied to the load 14 in accordance with control signals supplied to a control electrode 24 associated with a control device 22 by the microprocessor 26. The operation of the two wire dimmer switch is otherwise essentially as set forth above. Note optional "lightly filtered" circuit 41, explained hereinafter.

In FIGS. 5, 6 and 7, information about the AC line 12 may be provided over the optional connection 40 through the "lightly filtered" circuit 41 to the microprocessor 26 for purposes described hereinafter.

According to the invention, the AC source voltage is provided to a low pass active filter 30, 30' and the output of the filter 30, 30' is supplied to a zero crossing detector 28. Thus, the AC line is filtered first, and the filter output is checked for the occurrence of zero crossings. The function of the filter 30, 30' is to substantially remove or attenuate frequency components of the AC line above the fundamental frequency (or above twice the fundamental frequency in certain cases), and to do so "quickly", i.e., with minimum, phase delay. In other words, the filter has a substantially flat frequency gain characteristic up to about the fundamental frequency (or up to about twice the fundamental frequency in certain cases) and a rapidly decreasing gain characteristic thereafter, and interposes a substantially linear phase delay (constant time delay) in the pass band to the fundamental frequency component. The output of the filter therefore is the AC fundamental component (or the second harmonic frequency of the AC fundamental component in certain cases), time delayed by a constant amount relative to the AC line, that is substantially free of noise and distortion. Importantly, since the output of the filter is the AC fundamental component (or the second harmonic frequency of the AC fundamental component) of the AC line, any fundamental frequency variations on the AC line will appear in the AC fundamental component (or the second harmonic frequency of the AC fundamental component) at the filter output. Therefore, the AC fundamental component (or the second harmonic frequency of the AC fundamental component) present at the filter output is a nearly ideal signal for zero crossing detection.

Figure 10A:
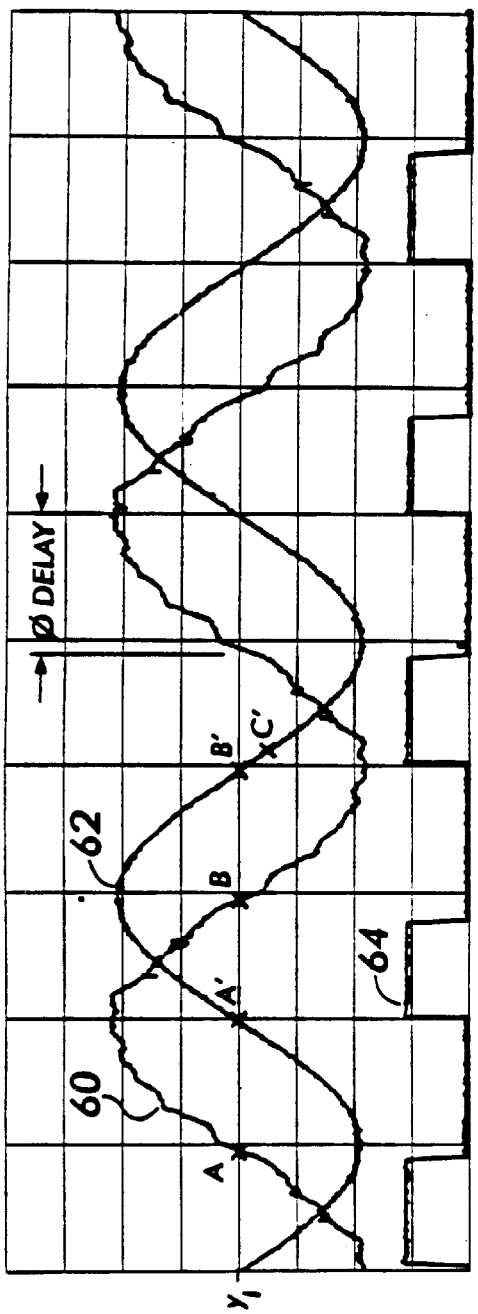
FIG. 10A illustrates an AC line voltage waveform, and a recovered, phase delayed, AC fundamental waveform, together with an exemplary output from the zero crossing detector.

FIG. 10A is a plot showing the AC line entering the filter 30, line 60 of FIG. 10A, and showing the output of the filter (AC fundamental), on line 62 of FIG. 10A. Line 64 of FIG. 10A shows the output of the zero crossing detector 28, where rising edges are indicative of zero crosses of the AC fundamental, line 62. The plots shown are for a 50 Hz line frequency, i.e., a 10 msec half period. The plot of FIG. 10A is applicable to embodiments of the invention where the filter 30 is on the AC side of the dimming circuit, e.g., FIG. 5. It will be seen that, in the example of FIG. 10A, the plot 62 of the output of the filter 30 is phase delayed relative to the AC line plot 60 by approximately 5 msec. When the AC line 60 crosses from the negative half cycle to the positive half cycle (i.e., zero crosses) at point A, this is not detected by the microprocessor 26 until point A' (approximately 5 msec later). When the AC line 60 crosses from the positive half cycle to the negative half cycle at point B, this is not detected by the microprocessor until point B'. The total phase delay time is the filter delay time. The filter delay time is dependent on the cut off frequency selected. In the preferred embodiment, the cutoff frequency selected is 55 Hz. This results in approximately a 5 msec filter delay time. The microprocessor 26 processes the information about the zero crosses from point B' to point C'; this is less than 1 msec.

The information about the zero crosses is used by the microprocessor 26 to determine the half period of the AC fundamental 62, which will be used in order to properly gate the thyristor. The microprocessor is programmed to attempt to maintain constant duty cycle. Constant duty cycle means that even if the AC line frequency changes (which will change the time between zero crosses), the amount of power output to the load will be held constant. In order to maintain constant power while the AC line frequency is changing, the amount of time after the zero cross that the thyristor is to be fired must be adjusted. If the AC line frequency increases, e.g., if the frequency changes from 50 Hz to 50.1 Hz, the time between zero crosses decreases and the amount of time after the zero cross that the thyristor is to be fired must be decreased in order to keep the output power constant. The opposite happens when the frequency decreases. Constant duty cycle is explained in more detail below in relation to FIG. 12.

Preferably, the filter 30 is designed to remove or substantially attenuate frequency components of the AC line voltage waveform that are substantially equal to third harmonics and greater of the AC fundamental. Second order harmonics are not an issue on the AC line, and any noise and distortion components are likely to be in a frequency range greater than the second harmonic frequency. Though an ideal filter would provide no phase delay, practical filter implementations always interpose some phase delay. In the preferred embodiment of the filter 30 of the present invention, the phase delay should not be more than half the period of the fundamental frequency (i.e. less than 180°) to ensure proper dimming function. In a 60 Hz line, conduction angles of 135° or more, which translates to about 1–3 nmsec of conduction time of the thyristor, represents the dimming range where noise, distortion, etc. are most likely to be manifested as flickering and intensity variations. Therefore, from a practical standpoint, the phase delay should be no greater than about 135° to provide adequate time (within each half cycle of the AC line) for the microprocessor to compute a conduction angle and fire the thyristor well within this range of the half cycle.

In the examplary plot of FIG. 10A, if the requested dimming level is low enough, it is still possible to fire the thyristor at point C', or after point C' in the negative half cycle, with the zero cross information of the same half cycle. It is at these low light levels when the present invention is most beneficial. If the requested dimming level is such that the thyristor must be fired at a point prior to point C' in a half cycle, the system will wait until the next half cycle and will use the information from the previous half cycle. The system will use the most recent zero cross and period information available, which may be from an earlier half cycle of the same polarity.

In a best case scenario, the microprocessor 26 will use information about the zero cross from the same half cycle in which the thyristor is to be fired. If the dimming system is fading from a high light level to a low light level, the microprocessor 26 will change from using information a half cycle old (i.e., from the previous half cycle) to using information from the same half cycle to fire the thyristor. Determining and programming such a transition, however, may complicate the coding of the microprocessor. For simplicity, information about the length of the half cycle from two prior half cycles may be used. Another reason for waiting until the next positive half cycle to use information about the previous positive half cycle is that the positive half cycle and the negative half cycle might not be symmetrical about zero volts. It is preferred to correct the dynamic problems during the same polarity of half cycle that the problem occurred, even if it is delayed by a full cycle.

Turning now to FIG. 5, it will be seen that the filter 30 is coupled to receive the AC line 12 in unrectified form. In other words, as mentioned, the filter 30 is on the AC side of the circuit. The output of the filter 30 is supplied to zero crossing detector 28 as above described. Since the filter receives the AC line in unrectified form, i.e., the filter 30 receives the AC line at the fundamental frequency of 50/60 Hz, the criteria of an embodiment of the present invention may require that the gain characteristic of the filter be substantially flat up to about the fundamental frequency of 50/160 Hz, but this is not critical to the overall operation of the invention.

In the dimmer switch 10' of FIG. 6, the filter 30' (which is substantially identical to filter 30, except as described hereafter) is coupled to receive the output of the full wave bridge rectifier 34. Thus, in the embodiment of FIG. 6, the filter 30' is on the DC side of the circuit, and receives the AC line in full wave rectified form rather than in unrectified form as in FIG. 5. The filter thus receives the AC line at twice the frequency of the AC line 12 (and at twice the frequency of the filter 30 of FIG. 5). Therefore, the criteria of an embodiment of the present invention may require that the gain characteristic of the filter be substantially flat up to about the twice the fundamental frequency of 50/60 Hz, i.e., that it be substantially flat up to about 100/120 Hz, although, again, this is not critical to the overall operation of the invention. The dimmer switch 10' of FIG. 6 is otherwise identical to that of FIG. 5.

Figure 10B:
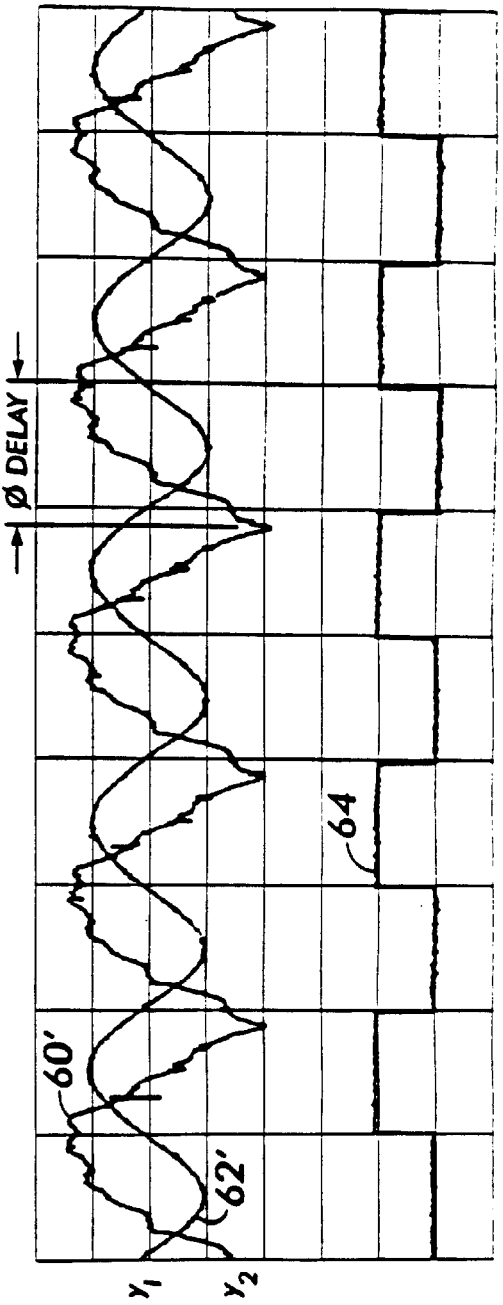
FIG. 10B illustrates an AC line voltage waveform which has been full wave rectified, and a recovered phase delayed, second harmonic frequency of the AC fundamental waveform together with an exemplary output from the zero crossing detector.

FIG. 10B is a plot showing the fill wave rectified AC line 60' and the recovered AC fundamental 62, i.e., the output of filter 30', for embodiments of the invention where the filter 30' is on the DC side of the dimming circuit, e.g., such as in the embodiment of FIG. 6. Note the phase delay between the two waveforms.

One important discovery that has been made in connection with the present invention is that there is sufficient information in the full wave rectified AC line to essentially reconstruct the second harmonic frequency of the fundamental component therefrom. Thus, when a filter 30' is constructed as described herein and is employed in the dimmer switch 10' of FIG. 6, the output of filter 30' will be the second harmonic frequency of the AC fundamental component, since the input is full wave rectified. This is illustrated in FIG. 10B where the input full wave rectified AC line is designated 60' and the output of the filter 30' is labeled 62. It will be noted that the output 62 is phase delayed in respect to the input 60', as discussed above.

The phase delay of output waveform 62 from input waveform 60' is due to two components, a 90° phase shift caused by the full wave rectification, i.e., 2.5 msec for a 50 Hz supply and a 3 msec phase delay through filter 30', which has a corner frequency of 111 Hz, for a total phase delay of approximately 5.5 msec.

In the dimmer switch 10" of FIG. 7, the filter 30 is disposed across the thyristor 22, and therefore receives the AC line in unrectified form, and the preceding discussion, of FIG. 5 is therefore applicable. In a two wire phase control dimmer switch, such as shown in FIG. 7, the voltage across the thyristor 22 is the only available signal. For each half cycle of AC line voltage, the voltage across the thyristor 22 begins at zero and follows the incoming AC line. When the thyristor is gated on, the voltage across the thyristor 22 collapses to the forward voltage drop of the thyristor (typically 1.5 volts). The voltage remains at the forward voltage drop until the end of the half cycle. The signal across the thyristor 22 is available for the control circuitry to interpret and use for controlling the thyristor 22, as well as ancillary circuitry. The signal across the thyristor 22 always contains some component of fundamental line voltage. The signal also contains a varying component of harmonics of the fundamental. This varying component of harmonics changes with light level setting as well as with incoming power line quality. As previously discussed, gating of a thyristor in an electronic dimmer requires a steady zero cross reference; this is also true for two wire dinners. Since the zero cross filter previously described has the characteristic of finding the fundamental in the presence of distorted waveforms, it is well suited for finding the fundamental remaining in the voltage across the thyristor 22'.

Figure 8A:
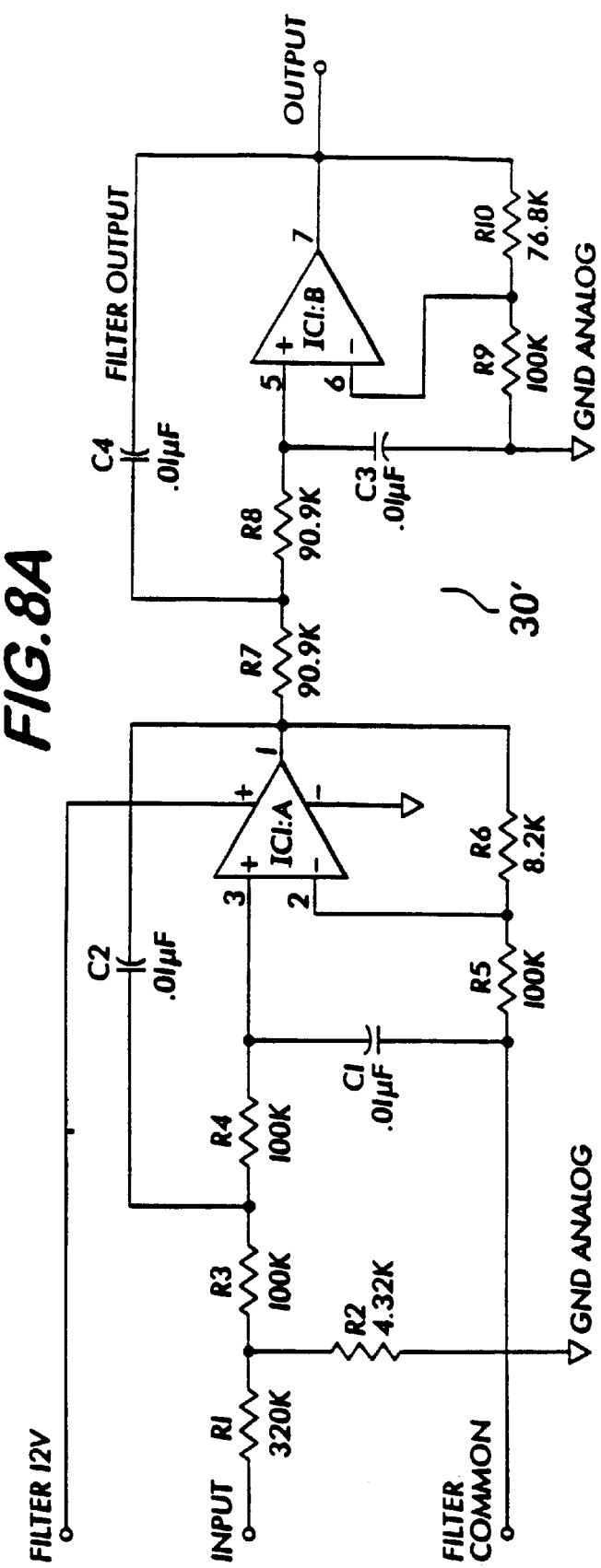
FIG. 8A illustrates the details of one circuit embodiment of a filter that may be employed in the practice of the present invention for recovering the AC fundamental waveform or the second harmonic frequency of the AC fundamental waveform from the AC line waveform.

A four pole Bessel filter has been found to provide the desired results discussed above. One preferred implementation of a four pole Bessel filter is illustrated in FIG. 8A. The implementation of FIG. 8A has particular application to the embodiments of FIGS. 5, 6 and 7 since, as described below, its gain and falloff characteristics have been designed to meet the criteria discussed above in connection with FIG. 6, namely a phase delay of no more than 135° at 120 Hz. (Implementation of a similar filter to meet the criteria of FIGS. 5 and 7 is straightforward.) THE ART OF ELECTRONICS by Paul Horowitz and Winfield Hill, second edition (1991), Chapter 5 (Active Filters and Oscillators), pp. 272–275, fully describes active filter design and design criteria, including design of Bessel filters, and is incorporated herein by reference in its entirety.

Figure 8B:
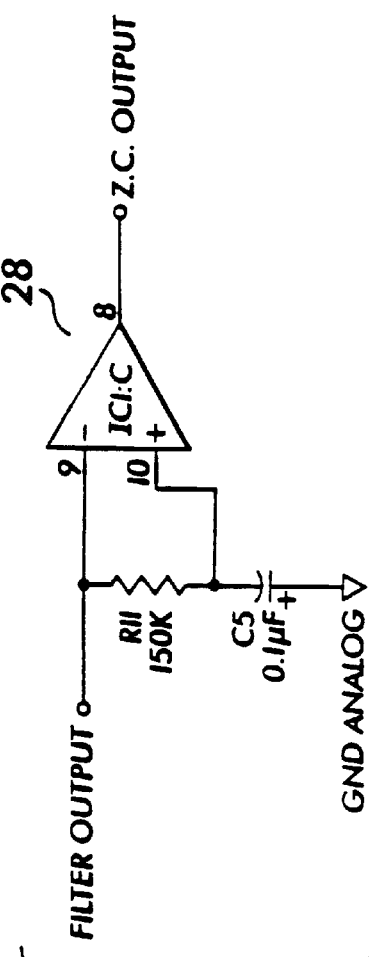
FIG. 8B is one embodiment of a zero crossing detector that may be employed in the practice of the present invention.

FIG. 8B illustrates one embodiment of a zero crossing detector that may be employed in connection with the present invention.

In FIGS. 8A and 8B, IC1 is a LM324N, as manufactured by SGS Thomson.

Figure 9:
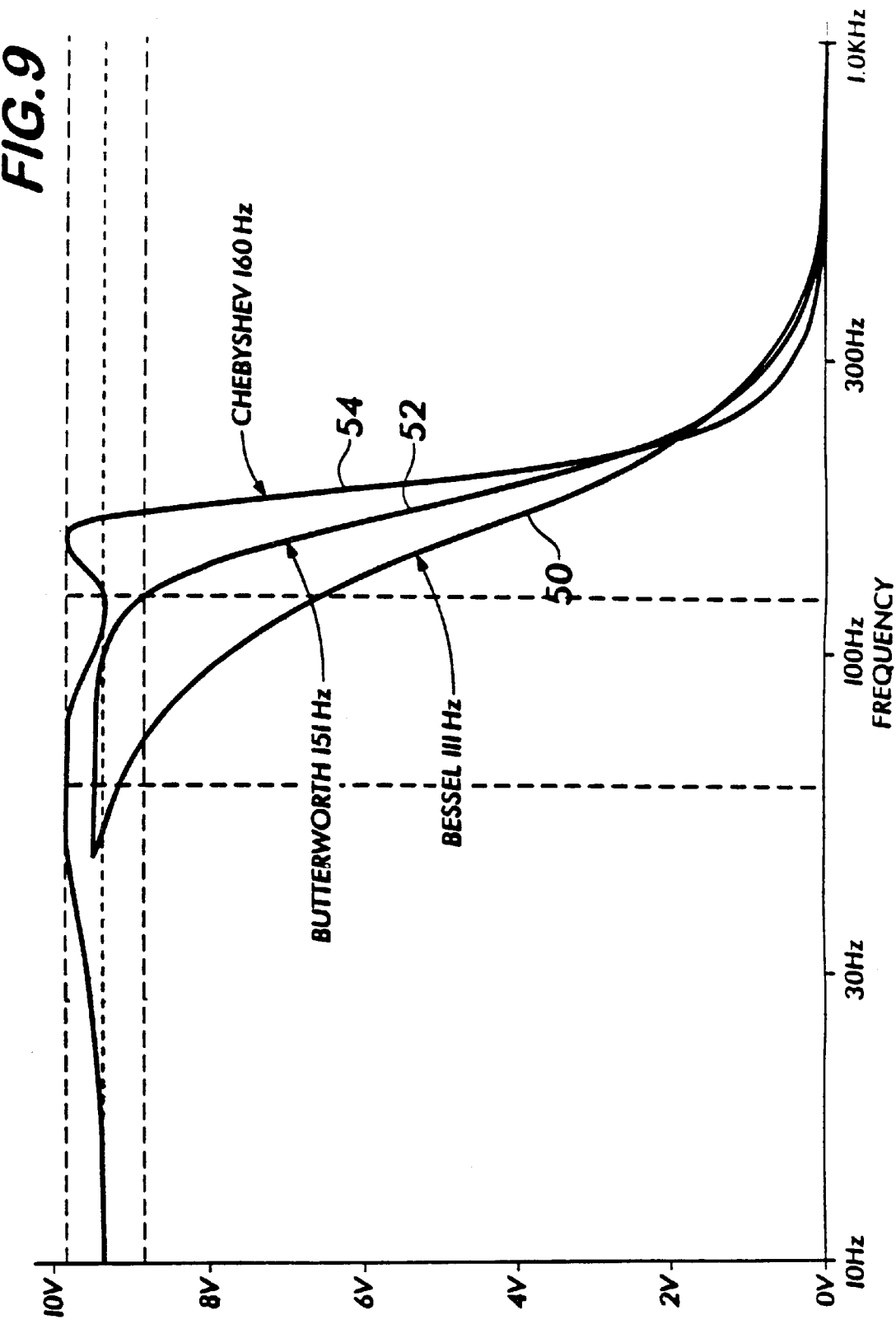
FIG. 9 is a spectral plot of filter characteristics for three different filter types.

FIG. 9 illustrates the gain characteristic of the Bessel filter of FIG. 8A (curve 50) and also illustrates gain characteristics of a Butterworth filter (curve 52) and a Chebyshev filter (curve 54) designed to provide about 135° phase delay at 120 Hz, as may be used with the embodiment of FIG. 6. As will be seen, the Bessel filter of FIG. 8A has a corner frequency of about 111 Hz and has (relative to the Butterworth and Chebyshev filters) a shallow gain rolloff such that the filter has no appreciable gain (less than 20°) above 300 Hz. In a similar filter designed for the embodiment of FIG. 5 or FIG. 7, the corner frequency would preferably be about 55 Hz and the rolloff would be such that the filter has no appreciable gain above about 150 Hz. Unexpectedly and advantageously, it has been found that a relatively shallow rolloff, such as shown by curve 50 for the disclosed Bessel filter, provides the most frequency attenuation with a constant phase delay, and also provides the most frequency attenuation in the portion of the frequency spectrum of most importance, i.e., in the first few harmonics of the fundamental. A Bessel filter is preferred but is not necessary, as the filter choice, since a Bessel filter is simpler to design and implement, and because it has a relatively constant phase delay, regardless of the AC line frequency.

Referring to FIGS. 10A and 10B, it will be seen that the filter output (recovered AC fundamental on line 62), or second harmonic frequency of the AC fundamental on line 62') is substantially cleaner then the incoming AC line.

Figure 11A:
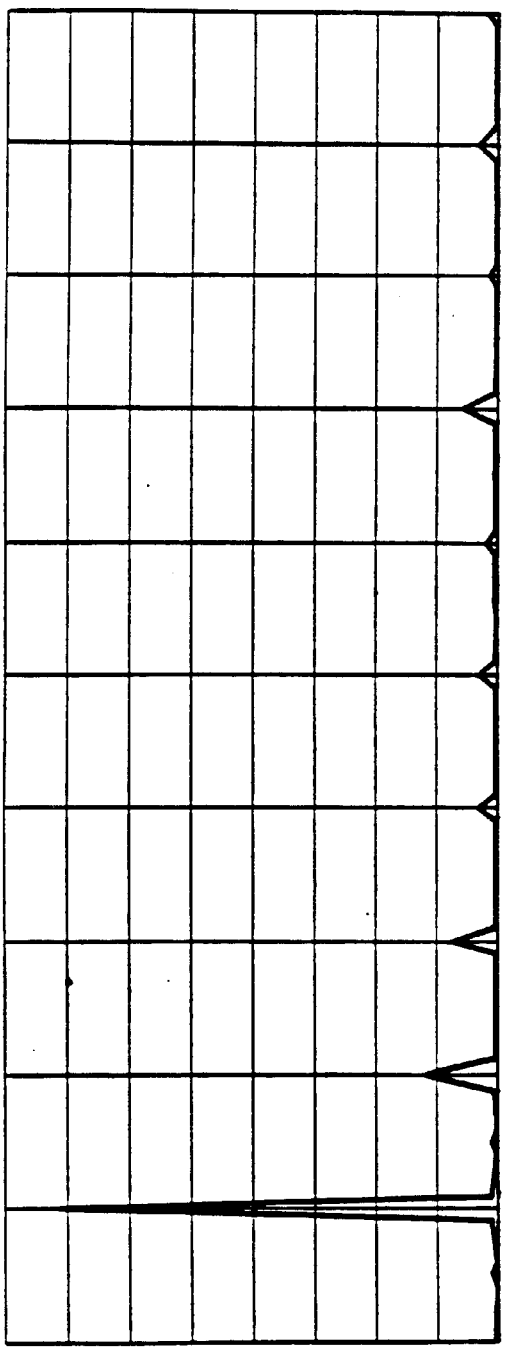
FIGS. 11A and 11B are spectral plots illustrating the performance of the present invention.
Figure 11B:
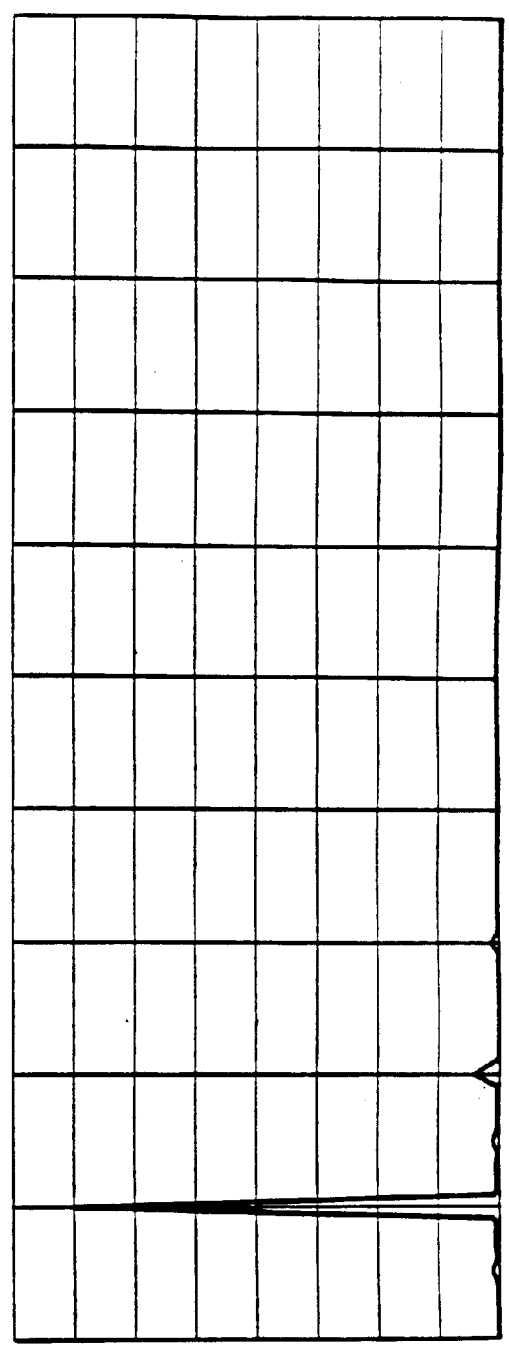

FIGS. 11A and 11B are spectral plots of an exemplary AC line into, and the recovered signal out of, the filter 30, respectively. It will be seen that the frequency content of the recovered signal above the fundamental frequency is substantially reduced relative to that of the AC line.

Figure 12:
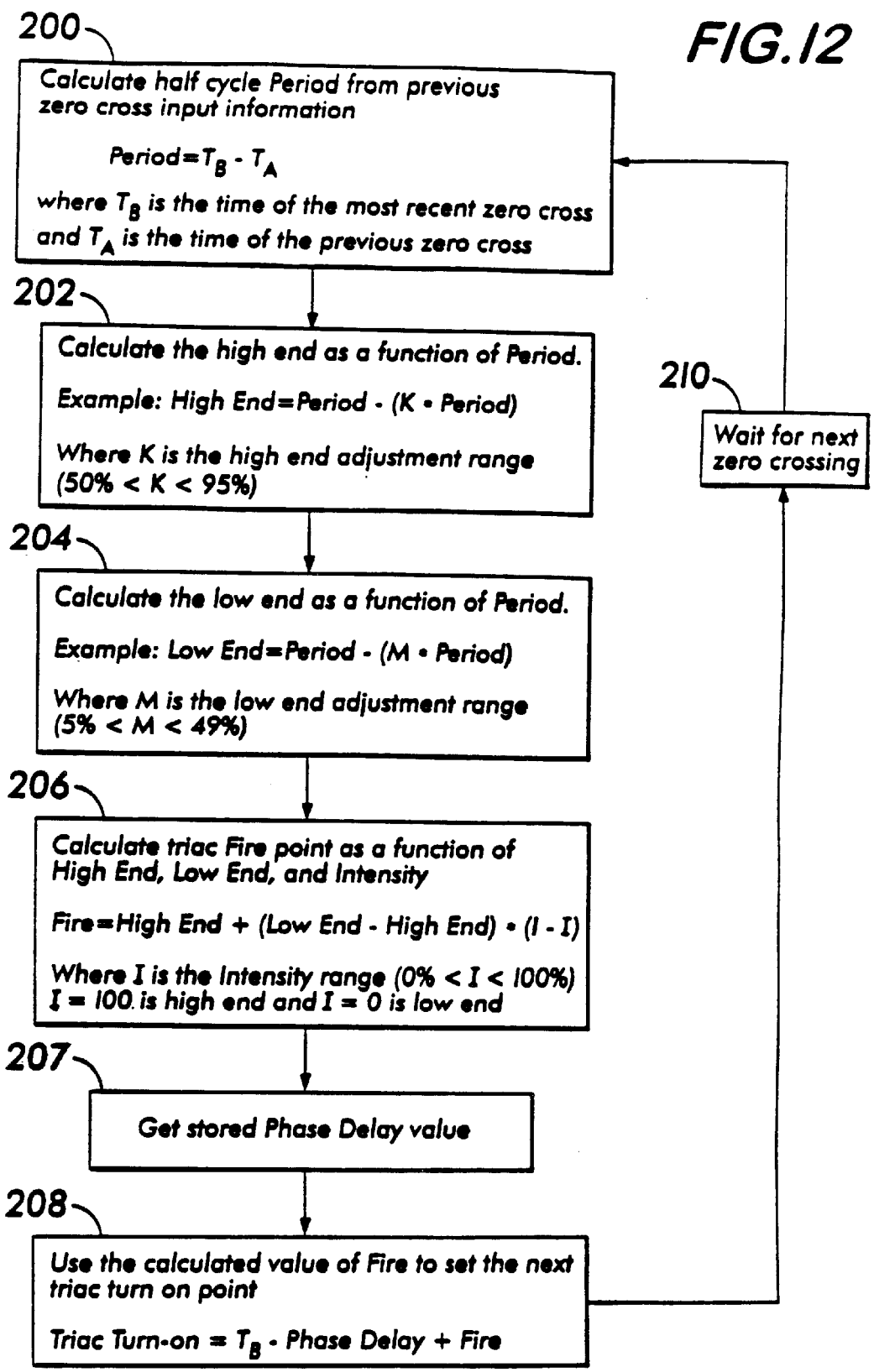
FIG. 12 is a flowchart illustrating an algorithm that may be carried out by a microprocessor, for maintaining constant duty cycle, according to one embodiment of the present invention.

FIG. 12 is a self-explanatory flow diagram for the microprocessor 26 for maintaining constant duty cycle. In order to make optimum use of the stable zero cross information, it is important to keep the thyristor conduction time a fixed duty cycle of the fundamental AC line frequency. In order to accomplish this, the computations to find the thyristor turn on point must first use the latest period time to find the high end and low end limits. At 200, the microprocessor captures the most recent Zero Cross ($T_B$) and the previous zero cross ($T_A$) of the output of the filter 30, 30' and then calculates the half cycle period. In a system presently commercially available from the assignee of the present application, sold under the name Grafik Eye 4000 Series Dimming Panels, the end user is allowed to set the maximum high end and the minimum low end. By adjusting the high end, the end user can either reduce the maximum voltage and extend incandescent bulb life or increase the maximum voltage and obtain more light output. At 202, the microprocessor calculates the high end as a function of the period. By adjusting the low end, the end user can properly set the minimum voltage which is very important with fluorescent loads. At 204, the microprocessor calculates the low end as a function of the period. The high end adjustment range is 50% to 95% (K), with the setting typically at about 95% for incandescent loads and at about 70% for fluorescent loads. For the typical incandescent load, set at the high end on a 60 Hz line, this results in a firing time of approximately 0.42 msec after the zero cross of the AC line. The low end adjustment range is 5% to 49% (M), with the setting typically at about 5% for incandescent loads and at about 30% for fluorescent loads. For the typical incandescent load set at the low end on a 60 Hz line, this results in a firing time of approximately 7.92 msec after the zero cross of the AC line. The system allows the end user to set a dimmer to a light level by selecting a value from a digital display. The display has an intensity range of 0–100, where an intensity I=100% represents the high end and an intensity I=0% represents the low end. At 206, the microprocessor determines the amount of time after the zero cross of the AC line to fire the thyristor using the formula: Fire =High end +(low end–high end) * (1–I). At 208, the microprocessor then fires the thyristor at time $T_B$–phase delay +Fire using a phase delay value retrieved from memory at 207. This phase delay value is the phase delay, φdelay, shown in FIGS. 10A and 10B. A nominal value for the phase delay of an ideal filter, e.g., 5 msec, can be stored in microprocessor 26 when the system is manufactured. This nominal value can be replaced with a value which reflects the measured actual phase delay of the specific filter 30, 30' connected to the microprocessor 26 as described below in connection with FIG. 13. At 210, the microprocessor then waits for the next zero cross, and the sequence begins again at 200.

Figure 13:
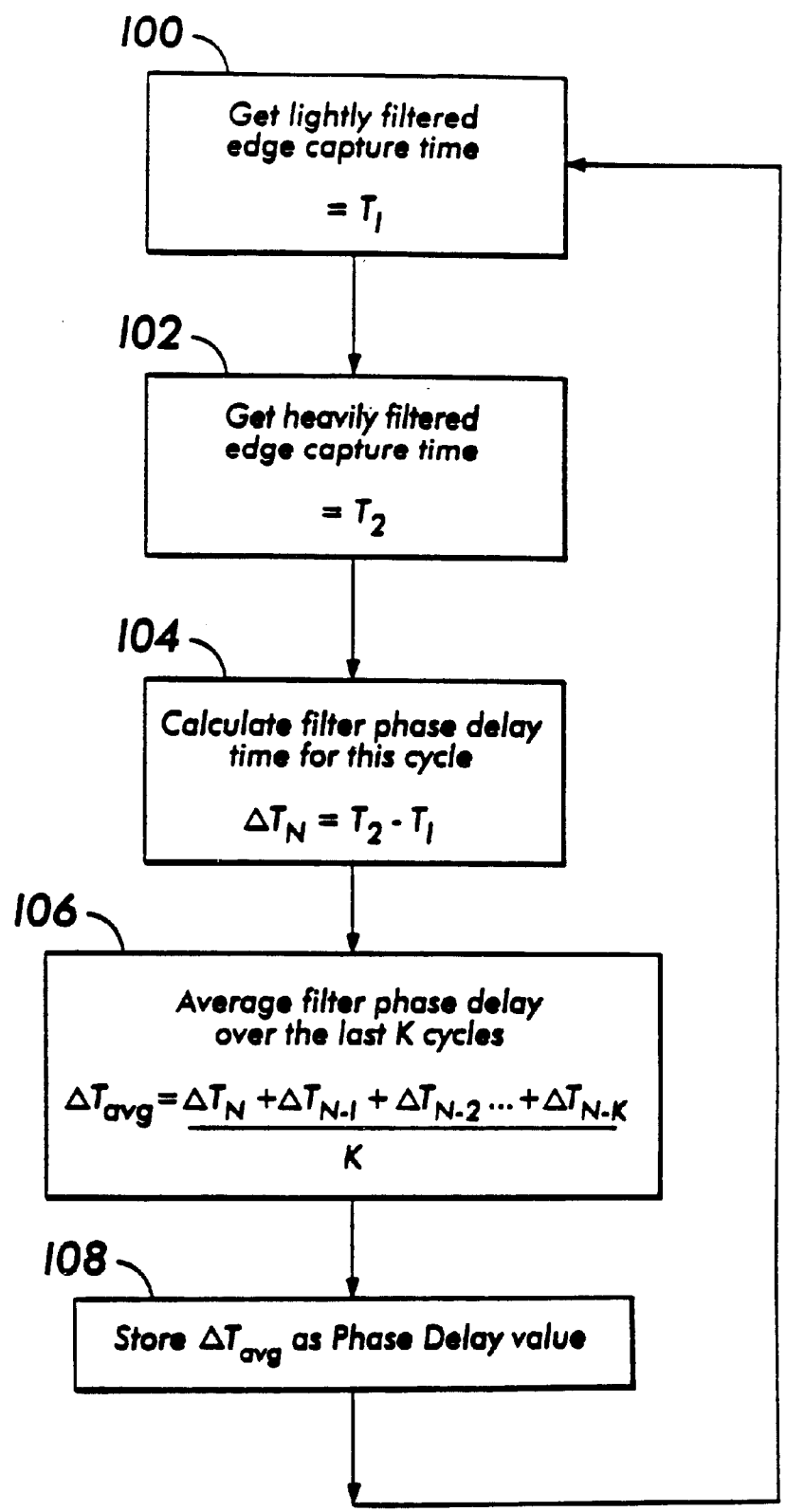
FIG. 13 is a flowchart illustrating a phase delay compensation that may be carried out by a microprocessor, according to an embodiment of the present invention.

It has been determined that, in mass production, the amount of phase delay through filters 30, 30' of FIGS. 5, 6 and 7 will vary by as much as 200 microsec within the same lot of components due to component tolerance. A variation of this size can cause undesired results especially at low light levels where the on time of the thyristor may be as little as 900 microsec. The phase delay may also change slowly as the components age or as the operating temperature changes. In order to compensate for this variation, the microprocessor 26 may be programmed to adjust for changes in the phase delay. FIGS. 5, 6 and 7 show, in part, a "lightly filtered" AC line input into the microprocessor 26. This circuit detects zero crosses directly off the AC line or through optional optocoupler 37 in the circuit of FIG. 5, with little or no phase delay. "Light filtering" can be performed by a simple (usually passive) low-pass filter, for example a single resistor-capacitor stage, whose cutoff frequency is low enough to remove as much as possible of the line noise, but, high enough that the phase delay it introduces at the fundamental frequency is small enough that variation of that phase delay with variation with component tolerances (even with low-precision components) is insignificant. Alternatively, the light filtering can be performed by software routines incorporated into microprocessor 26. FIG. 13 shows a filter phase delay compensation flowchart. In this embodiment of the invention, the system monitors the lightly filtered AC line 42 and measures the phase delay between it and the "heavily filtered" AC fundamental or second harmonic frequency of the AC fundamental output from the filter 30, 30'. "Heavy filtering" can be performed by a low-pass filter (such as the active low pass filter described above) whose cutoff frequency is close to the fundamental line frequency (or twice that frequency, when the input to the filter is a full-wave rectified waveform), or a narrow-band pass filter.

Using this information, the microprocessor 26 can derive the phase delay of the actual filter 30, 30' from the difference between the heavily filtered and lightly filtered inputs. Even if the lightly filtered line 42 is unstable due to line noise, the microprocessor 26 can average this value over many line cycles to minimize the influence of the noise. Thus, the microprocessor 26 can compensate for the phase delay.

FIG. 13 shows a flow chart for implementing the zero cross filter delay compensation system shown in dashed lines in FIGS. 5, 6 and 7. At 100, the microprocessor captures a zero cross from the lightly filtered line 42 into the microprocessor 26 as T1. At 102, the microprocessor captures a zero cross from the heavily filtered line output from the filter 30, 30' into the microprocessor 26 as T2. At 104, the microprocessor calculates the difference between T1 and T2 and stores it as ΔTn. At 106, the microprocessor takes an average of the last K samples of ΔTn and stores this as ΔTavg, where K is an empirically chosen value from 10 to 10,000. At 108, the microprocessor stores ΔTavg as the phase delay value to be retrieved at step 207 of the routine illustrated in FIG. 12 in place of any previously stored value.

The routine illustrated in the flow chart of FIG. 13 is performed periodically to update the stored value of the phase delay. It is typically done whenever power is applied to the system and then at least once per day. However, it can be performed as frequently as many times per second.

Those skilled in the art will appreciate that a band pass filter, a circuit containing passive circuit elements, a switched capacitor filter or a software implementation of the analog hardware filter disclosed herein may be employed, and such substitution is within the scope of the present invention. A system employing digital signal processing (DSP) with a high speed analog to digital converter (i.e., greater than 20 kHz) can sample and then recreate the incoming AC line. Using either a fast Fourier transform or DSP programmed to perform as a low pass or band pass filter, the system can "filter" out any frequency above the fundamental. This could be used instead of the filter described above. The remaining fundamental frequency can then be fed into the zero cross detector and then into the microprocessor in order to properly fire the thyristor, as was previously described. The DSP, zero cross detector and microprocessor can be incorporated into one device.

The present invention may be embodied in on other specific forms without departing from the spirit or essential attributes thereof, and accordingly, reference should be made to the appended claims, rather than to the foregoing specification, as indicating the scope of the invention.

What is claimed is:

1. A load control system for reliably controlling the power applied to a load from an alternating current (AC) power source wherein the power may contain undesired noise, distortion, or frequency variation, the system comprising:

(a) a Bessel filter including an input to receive the power and an output to provide a filtered AC signal, the Bessel filter adapted to attenuate frequency components of the power that are substantially equal to third order harmonics and greater of an AC fundamental frequency;

(b) a zero crossing detector coupled to the output of the Bessel filter to provide a zero crossing indication signal;

(c) a microprocessor coupled to the output of the zero crossing detector, the microprocessor responsive to the zero crossing indication signal and to a signal indicative of a desired power level to provide a control signal; and (d) a controllably conductive device including a control lead coupled to an output of the microprocessor and responsive to the control signal, an input coupleable to the AC power source, and an output coupleable to the load.

2. The load control system of claim 1 wherein said Bessel filter comprises:

(a) a first stage including a first differential amplifier having a first non-inverting input and a first inverting input, the first non-inverting input resistively coupled to the Bessel filter input, a first amplifier output, a first capacitor connected between the first amplifier output and the first non-inverting input, a second capacitor connected between the first non-inverting input and a circuit common, and a first resistor divider network connected between the first amplifier output and the first inverting input; and (b) a second stage including a second differential amplifier having a second non-inverting input and a second inverting input, the second non-inverting input resistively coupled to the first amplifier output, a second amplifier output coupled to the Bessel filter output, a third capacitor connected between the second amplifier output and the second non-inverting input, a fourth capacitor connected between the second non-inverting input and the circuit common, and a second resistor divider network connected between the second amplifier output and the second inverting input.

3. The load control system of claim 1 wherein said zero crossing detector comprises:

(a) a differential amplifier having an inverting input, a non-inverting input, and an output, the inverting input coupled to the input of the zero crossing detector, and the output of the differential amplifier connected to the output of the zero crossing detector (b) a resistor connected between the inverting and non-inverting inputs; and (c) a capacitor connected between the non-inverting input and a circuit common.

4. The load control system of claim 1 wherein the Bessel filter provides a substantially linear phase delay of less than one-half of a period of the AC fundamental frequency.

5. The load control system of claim 1 wherein said controllably conductive device comprises a triac.

6. The load control system of claim 1 further comprising:

a low pass filter having an input coupled to the power source and an output coupled to the microprocessor, the low pass filter having a cutoff frequency adapted to substantially attenuate noise present in the power and to have substantially less phase delay than the Bessel filter;

the microprocessor detecting zero crossings of the output from the low pass filter and comparing the detected low pass filter zero crossings to the filtered AC signal zero crossings to determine the phase delay of the Bessel filter, the microprocessor adjusting the timing of the control signal to compensate for the phase delay of the Bessel filter.

7. A load control system for controlling power delivered from an AC line to a load, wherein the AC line has a fundamental component with a fundamental frequency, comprising:

(a) a filter coupled to the AC line so as to receive all components and noise present in, and any distortions of, the AC line, the filter having low pass circuitry that:
  (i) provides a substantially linear phase delay of less than one-half of a period of the fundamental frequency;
  (ii) attenuates frequency components of the AC line that are substantially equal to third order harmonics and greater of the fundamental frequency; and,
  (iii) provides a filtered signal substantially free of noise and distortion present on the AC line;
(b) a zero crossing detector coupled to the filter to receive the filtered signal and provide an indication of zero crossings thereof;
(c) a microprocessor receiving an indication of a desired power level to be delivered to the load and receiving the zero crossing indications and being responsive thereto to provide control signals; and
(d) a controllably conductive device receiving the control signals and, in response thereto, controllably applying the AC line to the load in response to the control signals.

8. A load control system according to claim 7 wherein said low pass circuitry comprises a Bessel filter.

9. A load control system according to claim 7 wherein said controllably conductive device comprises a triac.

10. A load control system according to claim 7 wherein said zero crossing detector comprises:
  (a) a differential amplifier having an inverting input coupled to the filter, an non-inverting input, and an output coupled to the microprocessor;
  (b) a resistor coupled between the inverting and non-inverting inputs; and
  (c) a capacitor coupled between the non-inverting input and an electrical ground.

* * * * *

UNITED STATES PATENT AND TRADEMARK OFFICE
CERTIFICATE OF CORRECTION

PATENT NO. : 6,380,692 B1
DATED : April 30, 2002
INVENTOR(S) : Newman, Jr. et al.

It is certified that error appears in the above-identified patent and that said Letters Patent is hereby corrected as shown below:

Column 2,
Line 18, please delete "cue" and insert therefor -- cause --;

Column 3,
Lines 41, please delete "instaneous" and insert therefor -- instantaneous --;

Column 9,
Line 19, please delete "nmec" and insert therefor -- msec --;
Line 66, please delete "50/160" and insert therefor -- 50/60 --;

Column 10,
Line 17, please delete "fill" and insert therefor -- full --;

Column 11,
Line 26, please delete "comer" and insert therefor -- corner --;
Line 29, please delete "20º" and insert therefor -- 20% --;

Signed and Sealed this

Eleventh Day of March, 2003

JAMES E. ROGAN
*Director of the United States Patent and Trademark Office*